United States Patent
Bähren

(10) Patent No.: US 7,840,741 B2
(45) Date of Patent: *Nov. 23, 2010

(54) SYSTEM FOR TRANSMITTING DATA BETWEEN TWO BUS SYSTEMS

(75) Inventor: Frank Bähren, Karlsruhe (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/500,159

(22) Filed: Aug. 7, 2006

(65) Prior Publication Data

US 2007/0112991 A1    May 17, 2007

Related U.S. Application Data

(63) Continuation of application No. 10/127,351, filed on Apr. 22, 2002, now Pat. No. 7,089,343.

(30) Foreign Application Priority Data

Apr. 20, 2001   (DE)   ............................... 101 19 472

(51) Int. Cl.
    *G06F 13/36*    (2006.01)
(52) U.S. Cl. ....................................... 710/306; 710/315
(58) Field of Classification Search ................ 710/306, 710/315, 129
    See application file for complete search history.

(56) References Cited

U.S. PATENT DOCUMENTS

| | | | |
|---|---|---|---|
| 4,231,086 A | 10/1980 | Tarbox et al. | |
| 4,719,621 A | 1/1988 | May | |
| 5,450,549 A * | 9/1995 | Casparian | 345/556 |
| 5,555,381 A * | 9/1996 | Ludwig et al. | 710/300 |
| 5,687,329 A | 11/1997 | Kaiser et al. | |
| 5,710,892 A * | 1/1998 | Goodnow et al. | 710/307 |
| 5,768,548 A | 6/1998 | Young et al. | |
| 5,835,739 A | 11/1998 | Bell et al. | |
| 5,991,844 A * | 11/1999 | Khosrowpour | 710/312 |
| 6,249,528 B1 * | 6/2001 | Kothary | 370/466 |
| 6,292,862 B1 * | 9/2001 | Barrenscheen et al. | 710/306 |
| 6,631,316 B2 | 10/2003 | Stam et al. | |
| 6,654,355 B1 | 11/2003 | Marbach et al. | |
| 6,665,601 B1 | 12/2003 | Nielsen | |
| 6,690,305 B2 * | 2/2004 | Meroth et al. | 341/63 |
| 6,745,369 B1 * | 6/2004 | May et al. | 716/1 |

(Continued)

OTHER PUBLICATIONS

Schneider, Uwe et al: "Taschenbuch der Informatik." 3$^{rd}$ Edition, Munich; Vienna, 2000. pp. 112f., 184-187, 226f.

(Continued)

*Primary Examiner*—Mark Rinehart
*Assistant Examiner*—Christopher A Daley
(74) *Attorney, Agent, or Firm*—O'Shea Getz P.C.

(57) ABSTRACT

An interface for transmitting messages between two bus systems including a receiver device for receiving a message from the first bus system, a classification device for classifying the message received from the first receiver device according to one of several predetermined classes, a translation device for translating the message based on a predetermined rule for each class into a message for transmission on the second bus system, and a transmitter device for transmitting the translated message on the second bus system.

18 Claims, 7 Drawing Sheets

U.S. PATENT DOCUMENTS

| | | | | |
|---|---|---|---|---|
| 6,807,167 | B1* | 10/2004 | Chakrabarti et al. | 370/352 |
| 6,832,142 | B2 | 12/2004 | Busse | |
| 7,003,577 | B1* | 2/2006 | Ueda et al. | 709/230 |
| 7,007,126 | B2 | 2/2006 | Gillespie et al. | 710/306 |
| 7,085,874 | B2* | 8/2006 | Penton et al. | 710/306 |
| 7,089,343 | B2* | 8/2006 | Bahren | 710/306 |
| 2002/0158879 | A1* | 10/2002 | Broghammer et al. | 345/555 |
| 2003/0130776 | A1 | 7/2003 | Busse | |
| 2004/0030861 | A1* | 2/2004 | Plackle et al. | 712/32 |
| 2004/0236893 | A1* | 11/2004 | May et al. | 710/306 |

OTHER PUBLICATIONS

Schneider, Hans-Jochen (edit): "Lexikon der Informatik und Datenverarbeitung." 3$^{rd}$ Edition. Munich; Oldenburg, 1991. pp. 125,128, 289, 333, 704.

Engesser, Hermann: "DUDEN Informatik. Ein Sachlexikon für Studium und Praxis." Mannheim: Vienna: Zurich: Dudenverlag, 1988, pp. 517, 519.

Motorola Semiconductor Technical Data. Product Proposal 16-Bit Microcontroller. Feb. 9, 2001, Denver, pp. 1-8.

MOST: MOST Media Oriented Systems Transport. Multimedia and Control Networking Technology. MOST Specification, Rev. 2.1, Document Version 2.1-00, Feb. 2001. Karlsruhe: MOST Cooperation, 2001, pp. 21, 184-185.

MOST: MOST Media Oriented Systems Transport. Multimedia and Control Networking Technology. MOST High Protocol Specification, Rev 2.1; Karlsruhe, pp. 21-31 and 33-34.

Grießbach, Robert et al: "Byteflight- Neues Hochleistungs-Datenbus-System Für Sicherheitsrelevante Anwendungen," ATZ/MTZ, special edition "Automotive Electronics," Jan. 2000, pp. 60-67.

* cited by examiner

SYSTEM FOR TRANSMITTING DATA BETWEEN TWO BUS SYSTEMS

PRIORITY INFORMATION

This application is a continuation of Ser. No. 10/127,351 filed Apr. 22, 2002, now U.S. Pat. No. 7,089,343.

BACKGROUND OF THE INVENTION

The invention relates to an interface for transmitting messages between two bus systems.

The technological task often arises of making available messages transferred in one bus system using a certain mechanism of information distribution for devices connected to a second bus system using a differently designed information distribution mechanism. Previous solutions to this problem have essentially used the approach of "packaging" messages from the first bus system at an interface to the second bus system into messages of a type suitable for the second bus system. The connected devices "unpack" the transmitted data to recreate the message in its original format of the first bus system and interpret it appropriately. This solution does not ensure satisfactory interoperability between bus systems. For example, it is not possible to develop the devices connected to the second bus system without taking into account the parameters of the first bus system since these devices must be able to interpret the "unpacked" messages in the format of the first bus system. In addition, the information distribution mechanisms and transmission capacities of the two bus systems may be so different that a translation of every message received from the first system into a packaged message distributed on the second system does not provide useful functionality of the systems.

Therefore, there is a need to provide an interface for the transmission of messages from one bus system to a second bus system as well as a method for transmitting these messages which permits complete interoperability of the bus systems and which allows development of devices connected to the second bus system without consideration of the parameters of the first bus system, or to address devices already existing for a given task and compatible with the second bus system with messages derived from the first bus system.

SUMMARY OF THE INVENTION

Briefly, according to an aspect of the invention, an interface for transmitting messages between two bus systems includes a first receiver device for receiving a message from the first bus system, a first classification device for classifying the message received from the first receiver device according to one of multiple predetermined classes, a first translation device for translating the message based on a predetermined rule for each class into a message for transmission on the second bus system, and a first transmitter device for transmitting the translated message on the second bus system. The classification enables each message to be appropriately translated based on its technical significance content.

Second devices of the above type are also provided for transmitting messages in the opposite direction from the second to the first bus system.

Irrespective of the bus system type, a message generally includes an instruction on the operation to be performed by a device, often combined with an address for the device and with one or more parameters. The instruction on the function to be performed may, for example, include one or more bytes at a fixed location in the message. The instruction may also be dispersed over several separated segments of the message.

In a motor vehicle bus system, for example, a first numerical value of the instruction may represent a request to a sensor connected to the bus system to report the coolant temperature of the vehicle, a second value may represent a message containing the coolant temperature indicated by the sensor as a parameter, a third numerical value may represent a request to a sensor to report the pressure of a brake system, etc. The number and meaning of the parameters contained in a message depends on this instruction. It thus represents a classification datum, on the basis of which the classification device is able to assign each received message to a class, which action enables the translation device to translate the message appropriately.

There exist bus protocols that require that a message of a certain class be cyclically repeated, whereas a message with the same information content in a second bus system may only be repeated when a parameter of the message changes. In order to translate such data correctly, the interface appropriately has a timer that reacts to the reception of a message via one of the bus systems by controlling a cyclic broadcast of the translated message on the other bus system.

In cases where a message is cyclically transmitted in both bus systems while the repetition rates of the message are different, it is useful if the interface includes a device for adjusting the repetition rates of these messages. This device may be a counter for counting the messages of a certain class arriving on one bus system that initiates transmission of the translated message on the other bus system when the count on the counter exceeds a certain limit. Appropriate selection of the limit allows the ratio of the cycle times at which the messages are generated on the two bus systems to be adjustable.

Conversely, to translate a message of a given class from a bus system in which messages of the relevant class are generated cyclically into a message for a bus system in which messages are generated only in the event of a parameter change, the interface is appropriately equipped with a comparator, the function of which is to compare a message of a given class received by one of the bus systems with a message of the same class received previously from this one bus system, and to output the received message only if its content differs from that of the previously received message of the same class. Through the use of this type of comparator, repetitions of the same messages on the other bus system may be suppressed so as to free up the transmission capacity of this other bus system for other tasks.

Since the sequence of the parameters of a message may in principle be arbitrary and may thus vary from one bus system to another, the translation device is preferably equipped with a permutation unit for permuting the elements of the received message corresponding to the parameters.

In addition, the translation device preferably has an arithmetic unit for applying a mathematical computational rule to one element of the message. Such an arithmetic unit is appropriate when the parameters of the messages to be translated are numerical values, the representation of which may differ in the two bus systems. Such differences may result from the type of binary representation of numerical values, for example as natural numbers with or without sign, as real numbers with fixed-point, floating-point, or exponential notation and of varying precision (bit number), or also by applying different measurement units or scales when the parameters reflect measured values.

A preferred application of the interface is the conversion of messages between a CAN bus system and a MOST bus system in a motor vehicle.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
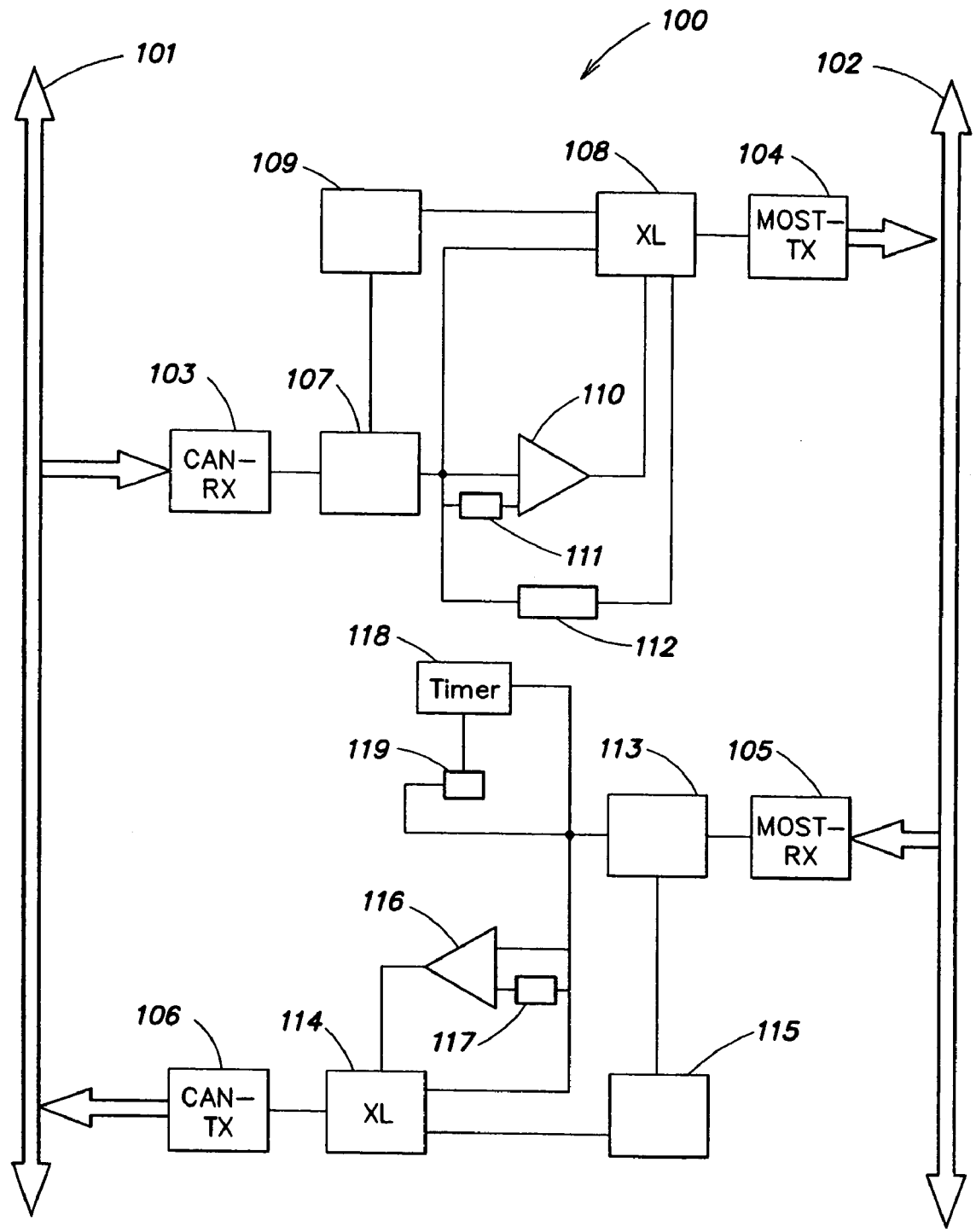
FIG. 1 is a block diagram illustration of an interface between system buses.

FIG. 1 is a block diagram of an interface 100 between a CAN-bus 101 and a MOST-bus 102. A CAN receiver device 103 converts the physical data format used on CAN-bus 101 into a representation used in the interface. A MOST transmitter module 104 converts the internal representation to the physical format used on the MOST-bus 102.

Figure 2A:
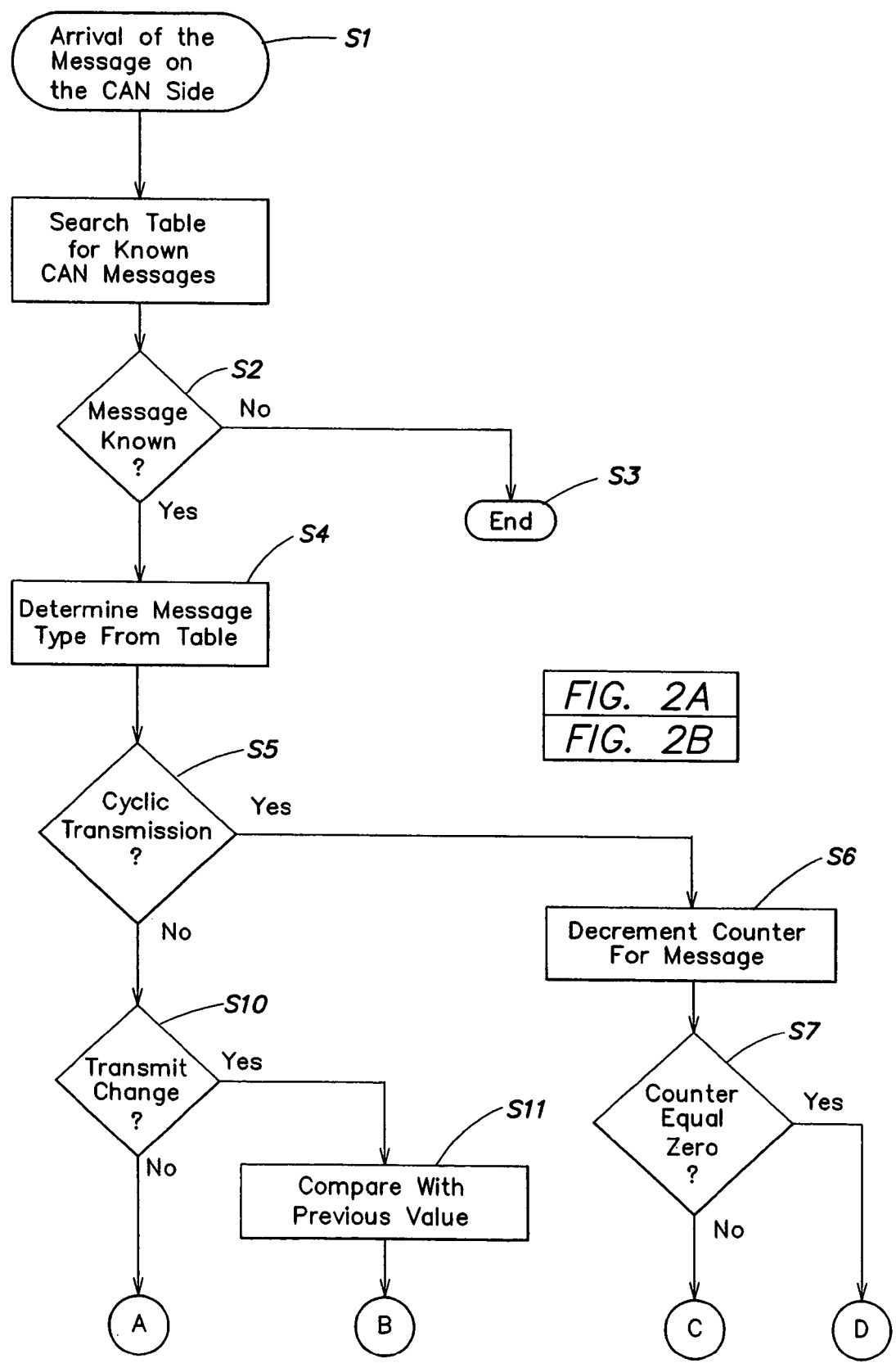
FIGS. 2-7 are flowchart illustrations of interface functions.
Figure 2B:
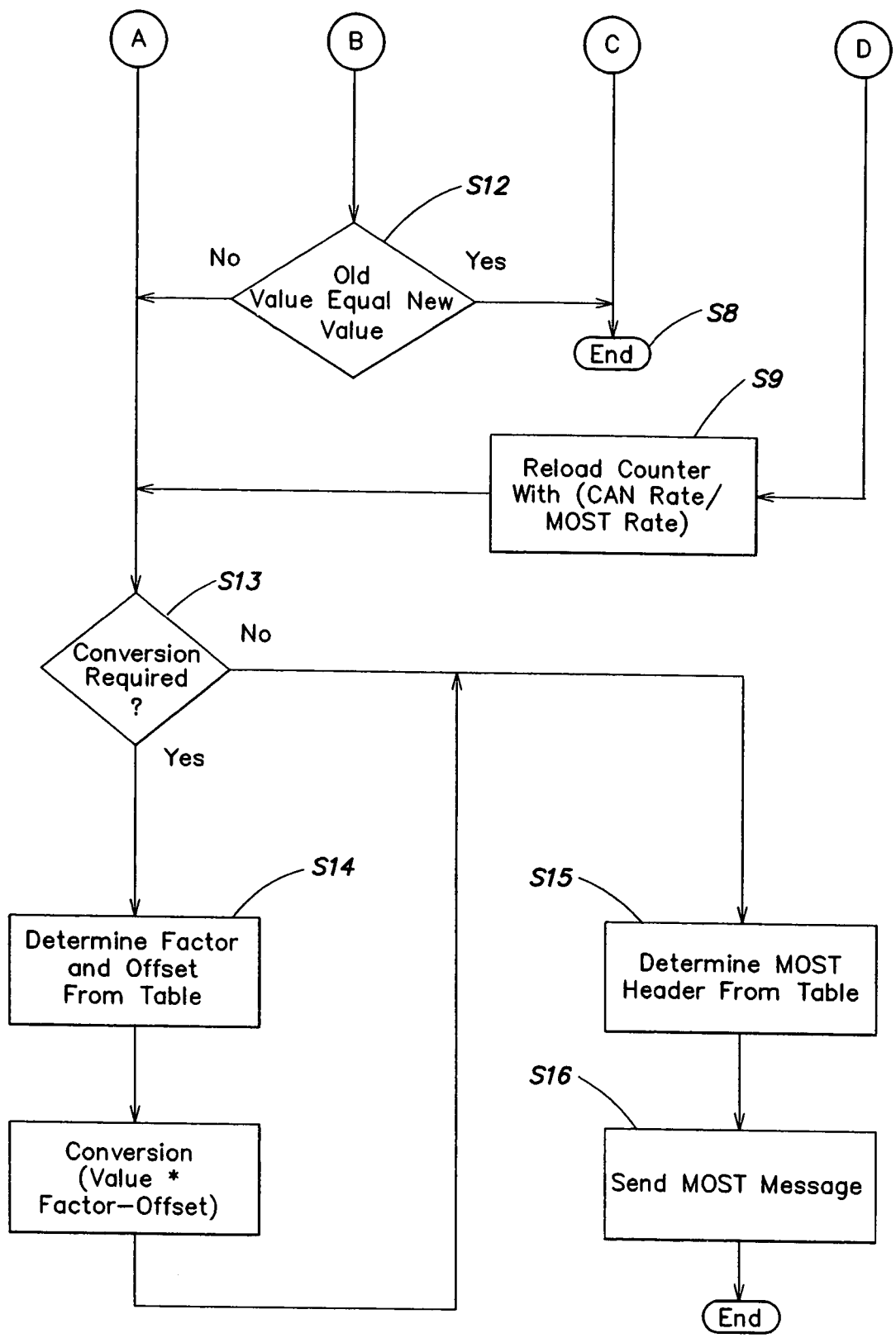

Attached to the CAN receiver device 103 is a classification device 107 that determines the class of the received message. Generally, two CAN messages belong to different classes when they have different report IDs or different format IDs. Attached to the output of the classification device 107 is a translation device 108 that receives, from the classification device 107, the instruction on the class of the message and its parameters, if present. Based on the class instruction, the translation device 108 accesses a memory 109 which, for each class, contains a rule for translating the message into a MOST message in the form of an entry in a table or of a program executable by the translation device 108. The information contained in such a table or the possible steps in such a program are discussed in more detail below with reference to FIG. 2. The class instruction may, for example, be a pointer to an entry matching the class or a corresponding program in memory 109.

Also connected to the classification device 107 is a plurality of comparators 110, buffer memories 111, and counters 112 which are each assigned to a certain class of messages. When the classification device 107 outputs a message of a class to which the comparator 110 and the buffer memory 111 are assigned, the comparator 110 compares the parameters supplied by the classification device 107 with the parameters of the previous message of this class supplied by the buffer memory 111. If the parameters are the same, the comparator 110 delivers a control signal to the translation device 108, which causes the translation device 108 not to output a translated message to the MOST transmitter unit 104. If the parameters are different, the new parameters are accepted by the buffer memory 111 and the control signal is not generated, with the result that the translated message is sent to the MOST-bus 102.

When the counter 112 is assigned to the class of message output by the classification device 107, the counter is decremented by one. If the status of the counter then differs from zero, the counter 112 delivers a control signal to the translation device 108, which prevents this device from delivering a translated message to the MOST transmitter unit 104. When the counter status is zero, the control signal is not generated, the translation device delivers the translation, and the count is reset to a predetermined initial value.

A MOST receiver device 105 delivers messages received on the MOST-bus 102 to a second classification device 113, the function of which essentially matches that of the classification device 107. A second translation device 114 is connected to the output of the classification device 113 and a memory 115, and translates a received MOST message based on the class instruction, parameters, and conversion rule stored in the memory 115 for each class into a CAN message. The CAN message is output to a CAN transmitter device 106 for transmission on the CAN bus. Here again, a comparator 116 and a buffer memory 117, the functions of which are the same as those indicated above for the comparators 110 and the buffer memories 111, are assigned to certain classes of messages.

An arrangement of a timer 118 and a buffer memory 119 is connected to the output of the classification device 113, these being assigned to certain classes, with the buffer memory 119 serving to record the classification instruction supplied by the classification device 113 along with its associated parameters and being cyclically prompted by the timer 118 in a predetermined rhythm to output this information to the translation device 114 to generate a CAN message.

While components 107-119 of the interface are described above as discrete components, it is nonetheless obvious that they may be realized without difficulty in the form of a suitably programmed microprocessor with attached memory. The interface translates a CAN message into a MOST message, which is described below with respect to FIG. 2.

When a CAN message is received (S1), the classification device 107 (FIG. 1) first checks whether the message belongs to one of its known classes. Classes for which a translation rule is present in the memory 109 are considered known here. If the message belongs to an unknown class (S2) there has either been a system error or it is a message that is exchanged only between devices connected to the CAN bus and is not intended for a receiver connected to the MOST bus. In both cases, the routine ends (S3) without translation of the message.

If the class of message is known, the classification device 107 determines the associated table entry or associated translation program in the memory 109 (S4). The content of the table entry or function of the translation programs depends on whether the message belongs to a class which is or is not sent out on the CAN bus and MOST bus cyclically, possibly with differing periods.

If it is determined in step S5 that the message is transmitted cyclically on both bus systems, the routine branches to step S6, and the counter 112 assigned to the relevant class of messages is decremented. Step 7 checks whether the counter has reached the value zero. If not, the routine (S8) ends without a MOST message being generated. If it is, the counter is reloaded in step S9 with a predetermined value that is a function of the ratio of the repetition rates at which messages of the relevant class are transmitted on the CAN bus or the MOST bus. If the frequency at which the message is transmitted on the CAN bus is n times the frequency on the MOST bus, and n is an integer, the counter in step S9 may be reloaded with the value n, and when decrementing in step S6, the counter content is reduced each time by one. If the frequencies are in a rational ratio p/q, where p, q are integers, then the counter in step S9 is loaded with value p and decremented each time in step S6 by q.

Subsequently, the routine proceeds to step S13 that will be explained later.

If the check in step S5 determines that the message does not belong to a class of messages which are transmitted cyclically on the MOST bus, the message may still be one which is in fact transmitted cyclically on the CAN bus but is transmitted on the MOST bus only when one of its parameters has changed. For this reason, step S10 checks whether the message belongs to this class. If it does, step S11 makes a comparison with the aid of the comparator 110 (FIG. 1) and the buffer memory 111 (FIG. 1) to determine whether the parameters of the message have changed since its last transmission. If not, there is no need to generate a MOST message, and the routine proceeds from step S12 to S8. If the parameters have changed, a MOST message must be generated and the routine proceeds from step S12 to step S13.

If step S10 determines that the message belongs to a class that is not cyclically transmitted either in the CAN system or the MOST system, the routine proceeds directly to step S13.

Step S13 checks whether the message belongs to a class in which the parameters are measured using different units or are differently scaled in the CAN system and MOST system. An example of such a parameter is engine speed. In CAN bus messages, it is transmitted as an unsigned byte, the numerical value of which is given by (engine speed/rpm—500)/40. On the other hand, in the MOST bus it is transmitted as a unsigned word, the numerical value of which corresponds directly to the engine speed in rpm. If a conversion is required, it is performed in step S14.

Then the MOST header fitting the class of message is selected based on translation information (S15) stored in the memory 109 (FIG. 1), and a message composed from the header and associated parameters is sent out on the MOST bus (S1 6).

In the event a message has multiple parameters the sequence of which is different in the CAN bus system and MOST bus system, a preliminary permutation step not shown in the figure may be required to put the parameters in the correct sequence.

In the above operational sequence, there is a multiplicity of decision steps S2, S5, S7, S10 in which, depending on the class of a received message a decision must be made as to the type and manner in which the message is subsequently processed. In order to make these decisions, it is possible each time to access the entry in the memory 109 (FIG. 1) corresponding to the class or to access a multiplicity of entries in memories in which the information required to translate a message of a given class is distributed. Specifically, when the components of the interface are implemented, as already mentioned above, using a microprocessor with attached memory, these diverse decision steps may be combined into a single step in which a translation program is selected from the memory 109 (FIG. 1) depending on the class of the message, which program is specific to a given class and which enables a direct translation of the message without requiring additional decisions dependent on the class.

Figure 3:
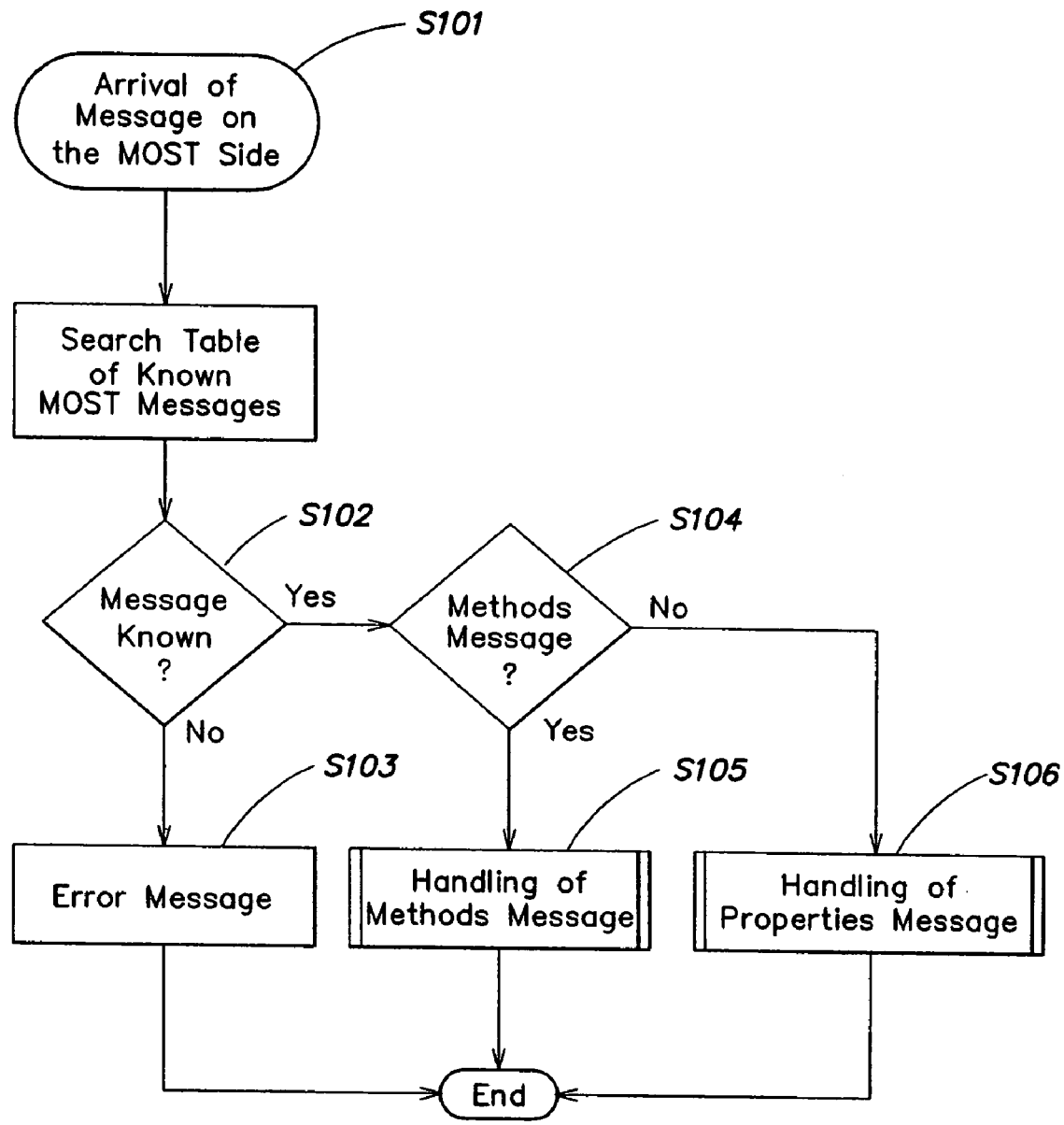

FIG. 3 is a flowchart illustration of a routine for converting a message received on MOST-bus 102 (FIG. 1) to a CAN message. Upon receiving a MOST message (S101), the classification device 113 (FIG. 1) checks whether the message belongs to a known class (S102). To do this, it extracts from the MOST message a function designator three bytes in length and checks whether this is contained in a list of known designators. In the routine shown in FIG. 2, an error has been detected and an error handling procedure S103 is initiated when the check of step S102 determines that the message does not belong to any known class. If the message does belong to a known class, step 104 follows with a decision on whether the message is a methods message or a properties message (i.e., whether the message is intended to prompt a receiver device to initiate an operation in which it intervenes as an active controlling element in its environment or whether the purpose of the message is to transmit information required by the receiver device for other tasks).

Figure 4:
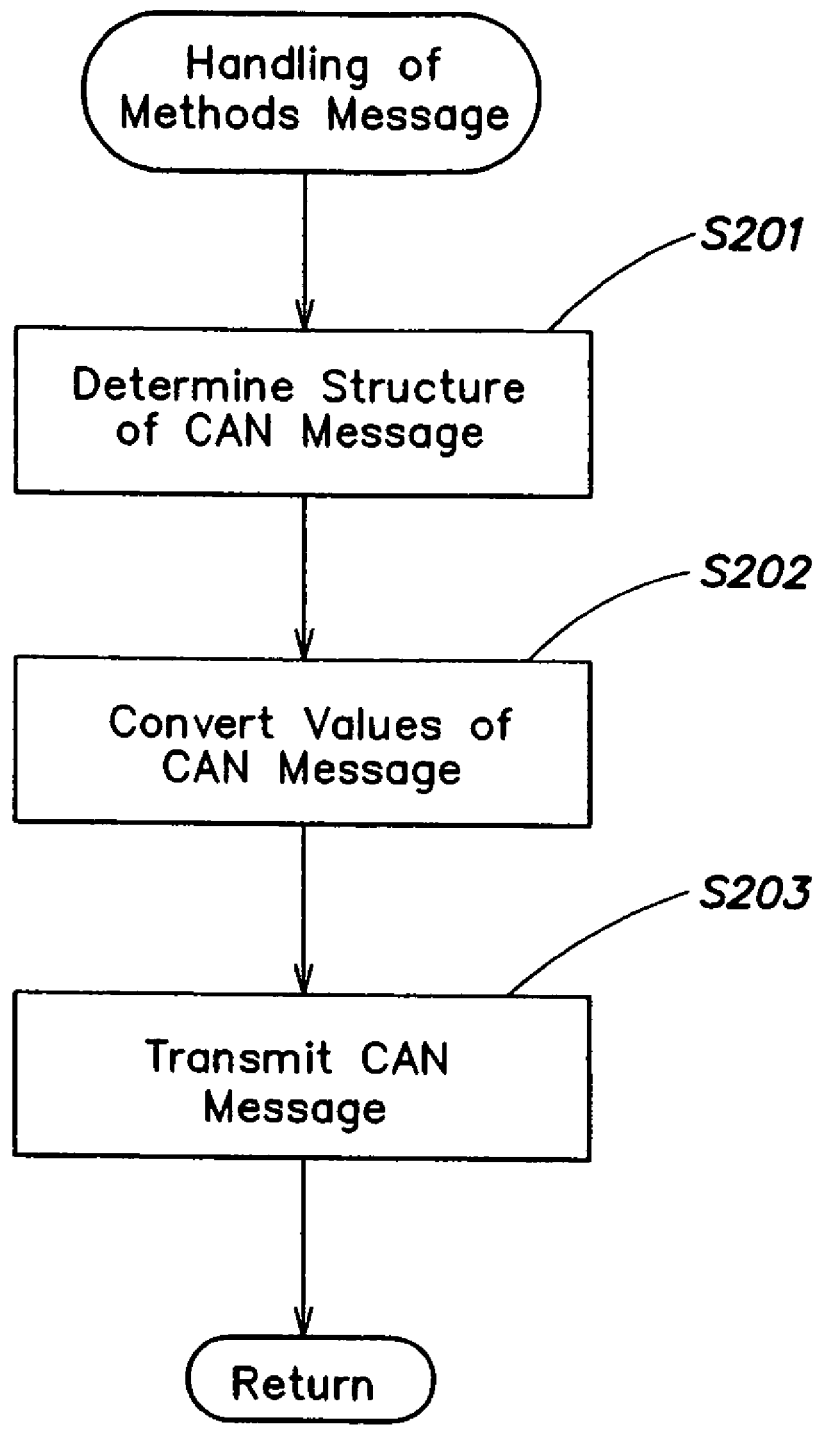

FIG. 4 illustrates a routine for handling of the methods message. Every proper methods message must be translated into a CAN message. The structure of this message is defined in the memory 115 (FIG. 1) and queried from there in step S201. The following, for example, are included in the queried structural information: the form of a header of the CAN message generated, significance, sequence, and scaling of parameters, etc. With this information, the translation device 114 (FIG. 1) can correctly convert parameter values from the scaling used in the MOST system to that of the CAN system, and combine them with the header in the correct sequence to form a CAN message (S202). This generated message is output in step S203 by the CAN transmitter unit 106 (FIG. 1) to the CAN-bus 101 (FIG. 1).

Figure 5:
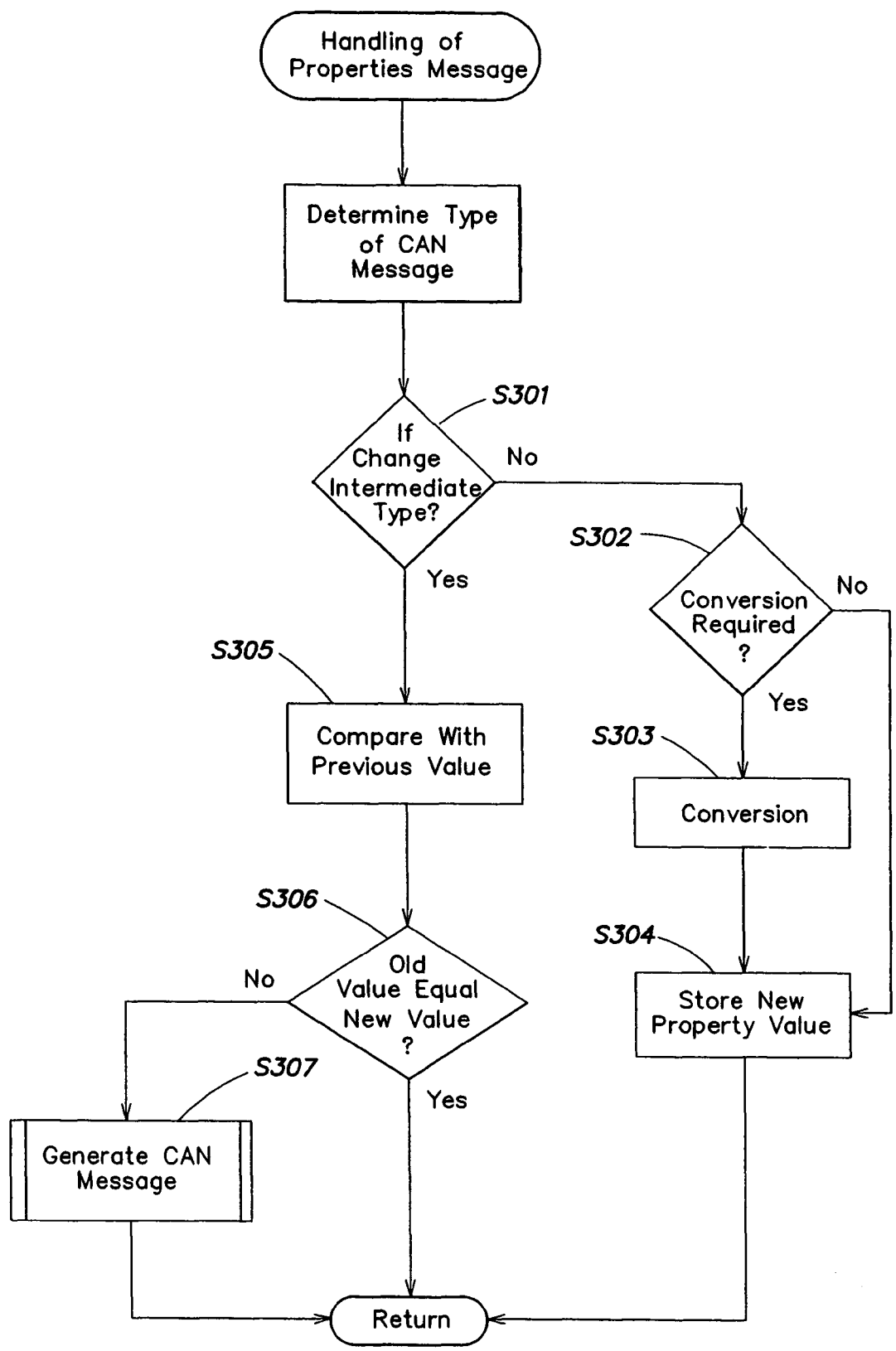

The handling of a properties message shown in FIG. 5 varies depending on which class the message belongs to. On the CAN side such properties messages may depending on the type of parameters transmitted in them, belong to three different groups or types, such as: (i) a first type of messages that are sent only when the parameters contained in it are requested by a receiver device, (ii) a second type of messages which are transmitted without a specific request by a receiver device being required but which are transmitted only when a modification of the value of a parameter contained in it occurs, or (iii) a third type in which the messages are also cyclically transmitted on the CAN bus but at a repetition rate that is generally different from that of corresponding messages on the MOST bus. If step S301 determines that the message belongs to the first or third type, processing proceeds to step S302 where a decision is made as to whether a conversion of the parameter values contained is required. If so, this conversion is performed in step S303 based on conversion information stored in the memory 115 (FIG. 1), and the parameter value thus obtained is stored in step S304 in an assigned register of the interface. A CAN message by which this modified parameter value is passed onto a device on the CAN bus is generated by the interface for a message of this type only when such a device requests transmission of the parameter value. Messages of the third type are transmitted on the CAN bus on a time-controlled basis, as the following discussion explains with reference to FIG. 6.

If the message belongs to the second type, step S305 compares the parameter value transmitted by the message (or parameter values if the message contains multiple parameters) with the parameter value(s) transmitted in the previous message of the same class. If this comparison (S306) shows that the values have remained the same, the process ends; if at least one value has changed, a CAN message is generated (S307).

Figure 6:
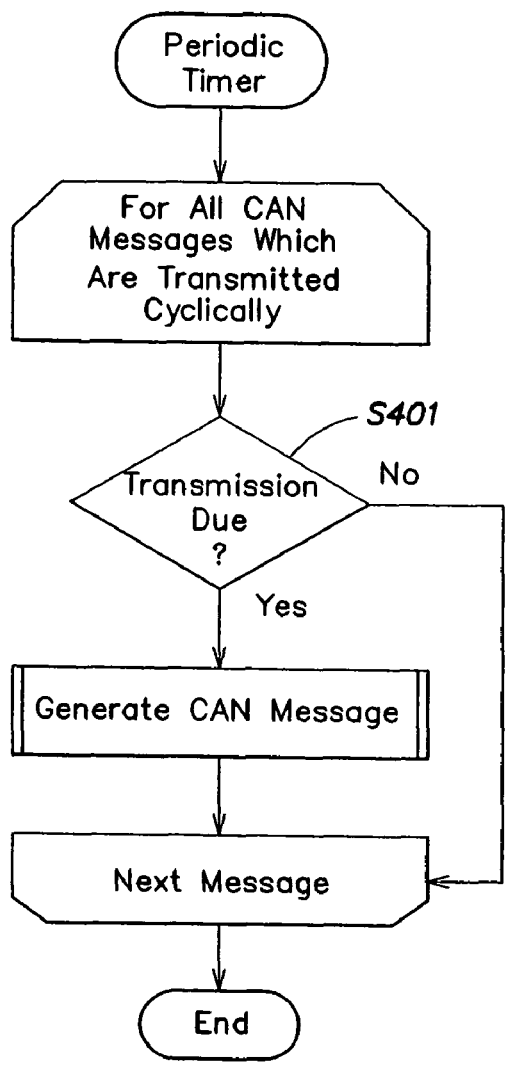

FIG. 6 illustrates the processing of those classes of CAN messages that are transmitted cyclically. Step S401 regularly checks to determine whether transmission of the message is due. This check may be performed, for example, by a timer 118 (FIG. 1) assigned to a class of such messages that initiates the transmission of the messages at regular intervals and which, as explained above, may include a counter which is cyclically decremented and triggers transmission of the CAN message when zero or any desired fixed value is reached. If the interface is implemented as a program-controlled microprocessor, another conceivable procedure is one in which the microprocessor examines the messages for cyclic transmission at short intervals to determine whether a transmission time planned for them has been reached and, if necessary, initiates transmission and defines a new transmission time.

Figure 7:
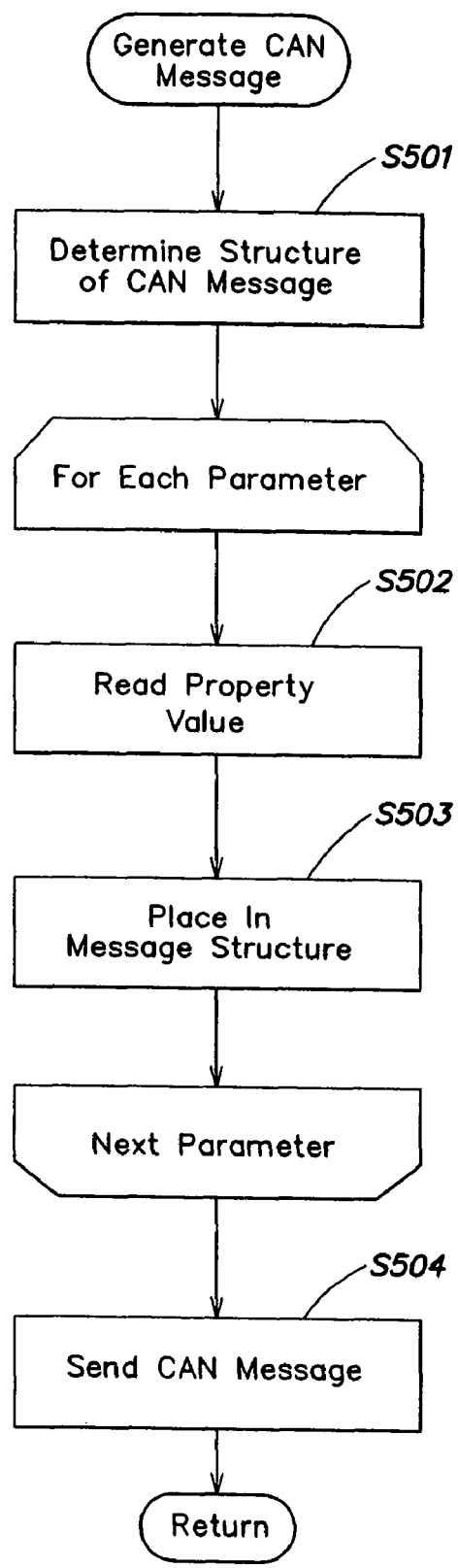

FIG. 7 illustrates a routine to generate a CAN message. In step S501 the translation unit 114 (FIG. 1) determines the structure of the CAN message to be generated based on the class supplied by the classification device 113 (FIG. 1) from memory 115 (FIG. 1). For each parameter of the CAN message to be generated, the translation unit 114 (FIG. 1) reads the corresponding parameter value from the received MOST message (S502), performs any necessary conversion of the parameter values and permutation of the sequence of the parameters needed to place these in the correct order for the CAN message to be generated (S503), and finally outputs (S504) the generated CAN message to the transmitter unit 106 (FIG. 1).

Although the present invention has been shown and described with respect to several preferred embodiments thereof, various changes, omissions and additions to the form and detail thereof, may be made therein, without departing from the spirit and scope of the invention.

What is claimed is:

1. An interface for transmission of messages between first and second bus systems, comprising:
    a first receiver device for receiving a message from the first bus system;
    a first classification device for classifying the message received from the first receiver device according to one of multiple predetermined classes;
    a first translation device for translating the message into a message for transmission on the second bus system based on a rule specified for each class; and
    a first transmitter device for transmitting the translated message on the second bus system, where the first bus is a synchronous bus and the second bus is an asynchronous bus.

2. The interface of claim 1, comprising:
    a second receiver device for receiving a message from the second bus system;
    a second classification device for classifying the message received from the second receiver device according to one of several predetermined classes;
    a second translation device for translating the message into a message for transmission on the first bus system based on a rule specified for each class; and
    a second transmitter device for transmitting the translated message on the first bus system.

3. The interface of claim 2, where the first and second classification devices define the class of a received message based on a classification datum contained in the message.

4. The interface of claim 3, comprising a timer which, upon receiving a message from one of the bus systems, controls a cyclic transmission of the translated message on the other bus system.

5. The interface of claim 3, comprising a repetition-rate-adjustment device to control the transmission of the messages obtained by translation of messages transmitted on one of the bus systems at a first repetition rate, and at a second repetition rate on the other bus system.

6. The interface of claim 5, where a counter for counting the messages of a certain class arriving on one of the bus systems and for triggering transmission of the translated message on the other bus system when the count of the counter exceeds a limit.

7. The interface of claim 6, where when the count of the counter exceeds a limit, it is reloaded with a predetermined value.

8. The interface of claim 7, where a comparator for comparing a message of a given class received by one of the bus systems with a message of the same class previously received by the one bus system and for outputting the received message if its content differs from that of the previously received message of the same class.

9. The interface of claim 7, where the translation device includes a permutation unit for permuting elements of the received message.

10. The interface of claim 7, where the translation device includes an arithmetic unit for applying a mathematical computational rule to an element of the message.

11. The interface of claim 7, where the translation device is program-controlled and is connected to a memory for storing the rules for translation in program form.

12. The interface of claim 1, where the bus systems are a CAN bus system and a MOST bus system.

13. A method for transmitting a message from a first bus system to a second bus system, comprising:
    classifying the message received by the first bus system according to one of several predetermined classes;
    selecting a translation rule based on the classification;
    translating the message based on the translation rule; and
    outputting the translated message on the second bus system, where the first bus is a synchronous bus and the second bus is an asynchronous bus.

14. The method of claim 13, where the step of classifying includes identification of a classification datum in the message.

15. The method of claim 14, where for at least one class of messages, the step of outputting is cyclically repeated.

16. The method of claim 15, where for at least one class of messages, a received message is compared with a previously received message of the same class, and step of outputting is performed only if the content of the received message differs from that of the previously received message.

17. The method of claim 16, where the step of translating includes a permutation of the elements of the message.

18. The method claim 17, where the step of translating includes the application of a mathematical computational rule to an element of the message.

* * * * *